Nov. 27, 1962          R. C. GASMIRE          3,065,501

METHOD OF AND APPARATUS FOR MAKING A PLASTIC ARTICLE

Filed Oct. 15, 1959          3 Sheets-Sheet 1

INVENTOR.
RICHARD C. GASMIRE
BY Wilbur A. Schaich
Charles S. Lynch
ATTORNEYS

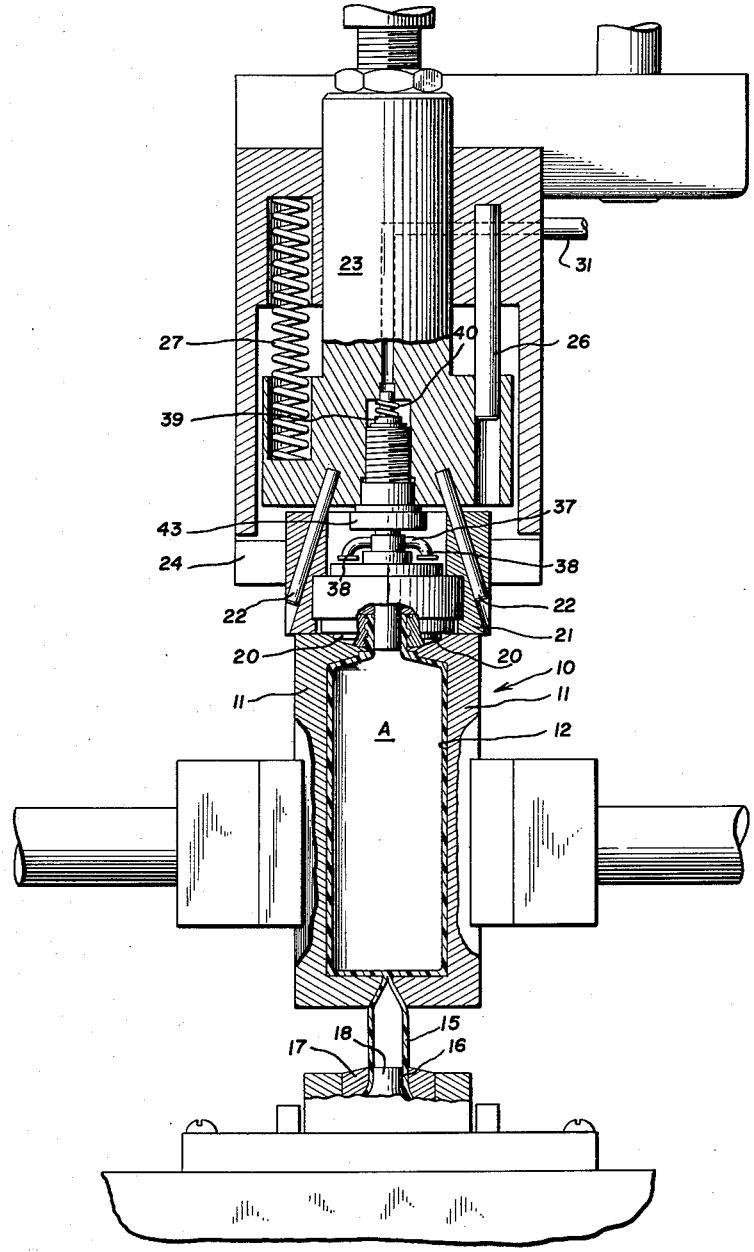

Nov. 27, 1962  R. C. GASMIRE  3,065,501
METHOD OF AND APPARATUS FOR MAKING A PLASTIC ARTICLE
Filed Oct. 15, 1959  3 Sheets-Sheet 3

INVENTOR.
RICHARD C. GASMIRE
BY Wilbur A. Schaich
Charles D. Lynch
ATTORNEYS

United States Patent Office 3,065,501
Patented Nov. 27, 1962

3,065,501
METHOD OF AND APPARATUS FOR MAKING
A PLASTIC ARTICLE
Richard C. Gasmire, West Chicago, Ill., assignor to
Owens-Illinois Glass Company, a corporation of Ohio
Filed Oct. 15, 1959, Ser. No. 846,720
22 Claims. (Cl. 18—5)

The present invention relates to a method of and apparatus for making a plastic article and more particularly to a method of an apparatus for blowing and cooling a blown plastic article.

In the manufacture of blown plastic articles, such as containers, toys, or the like, two generally accepted processes are presently in use. Exemplary of these processes are the disclosures of U.S. Patents Numbers 2,579,390 and 2,804,654. In each instance, an extruded tube or parison is enclosed in a blow mold and air at superatmospheric pressure, on the order of 60–100 pounds per square inch, is introduced to expand the extruded tube against the cavity-defining blow mold walls.

Although a substantial amount of heat is extracted by the mold walls upon wall-tube contact and also by the air serving as an internal heat transfer medium, a great part of the production cycle is consumed in cooling the blown tube in the closed mold to a dimensionally stable state, so that the article can be subsequently removed from the blow mold and further processed without deformation. Actually, it has been found that the blow mold closed portion of the cycle consumes from 40% to 70% of the complete forming cycle time.

To shorten the blow mold close time, the utilization of a gaseous refrigerant as a blowing medium has been attempted at superatmospheric pressure (on the order of 60 pounds per square inch) and substantially sub-ambient temperatures (on the order of from 0° F. to −70° F.). It was found that the refrigerant chilled the tube interior prior to and during contact with the mold to such an extent and so rapidly as to render the finished container susceptible to stress crazing. Also, poor interior surfaces were obtained in the finished article due to the large temperature gradient across the plastic tube wall during blowing and as it struck the mold wall. In a transparent or translucent bottle, a pitted interior surface was visible.

It has now been determined that the mold close time can be materially reduced by introducing a cooling medium into the article only after the article has been blown by an expansion medium at substantially ambient temperatures, i.e., at a temperature which does not so chill the tube prior to blowing as to prevent proper blowing. The expansion medium and the cooling medium can be the same, for example, gaseous carbon dioxide at about 60 pounds per square inch and about 70° F. can be used as the expansion medium and liquid carbon dioxide at about 60 pounds per square inch and −70° F. can be used as cooling medium. Alternatively, the media may be different, e.g., the expansion medium can be air at 60 pounds per square inch and ambient temperatures and the cooling medium can be carbon dioxide at 60 pounds per square inch and −70° F. Preferably, a phase change, e.g., the conversion of liquid or solid carbon dioxide to carbon dioxide vapor, is effected during cooling to gain the maximum heat extraction from the hot, expanded tube.

By internally cooling the tube after it has been expanded against the mold walls, the mold close time of the cycle can be drastically reduced. For example, at a material temperature of 300° F. and a mold temperature of 80° F. and utilizing circulating air at ambient temperatures, from 10 to 15 seconds is required to adequately cool a given molded article. By the utilization of liquid carbon dioxide vaporized to gaseous carbon dioxide internally of the blown article, this mold close time may be reduced to about four seconds.

It is, therefore, an important object to provide a method of making a plastic article wherein a blown plastic article is cooled by the introduction of a refrigerant thereto at substantially less than ambient temperatures.

Another object of the invention is the provision of an apparatus for sequentially introducing a blowing medium and a cooling medium into an extruded tube confined in a blow mold.

It is a further important object to provide a method of blowing plastic articles wherein a parison is expanded against the cavity of a blow mold by a gaseous blowing medium at substantially ambient temperatures and subsequently cooled by the introduction of a cooling medium undergoing a phase change internally of the blown article.

Yet another object is the provision of an apparatus for introducing a non-gaseous coolant into a blown article, vaporizing the coolant interiorly of the article, and accommodating venting of the vaporized coolant from the article interior.

Still another object resides in the method of making a hollow plastic article wherein a gaseous blowing medium is introduced into a tube to expand the tube against the cavity of a blow mold and subsequently a non-gaseous cooling medium is introduced into the blown article for cooperation with the blow mold to chill the blown article both interiorly and exteriorly, the latent heat of phase change of the cooling medium being utilized to extract heat from the interior of the article.

Other and further objects of the invention will appear from the following detailed description taken in conjunction with the annexed drawings.

On the drawings:

FIGURE 5 is a view similar to to FIGURE 1 illustrating a modified form of apparatus.

Figure 1:
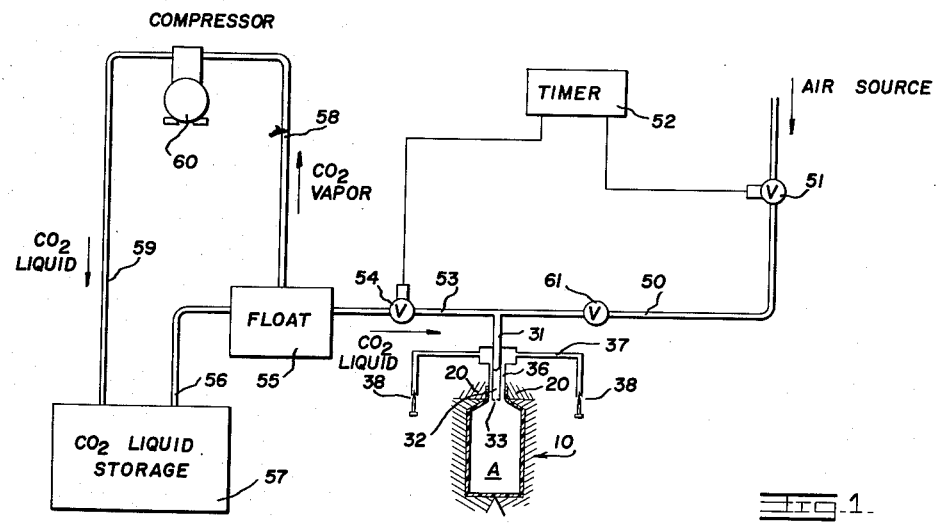
FIGURE 1 is a diagrammatic representation of an apparatus of the present invention capable of carrying out the method of the present invention.
Figure 2:
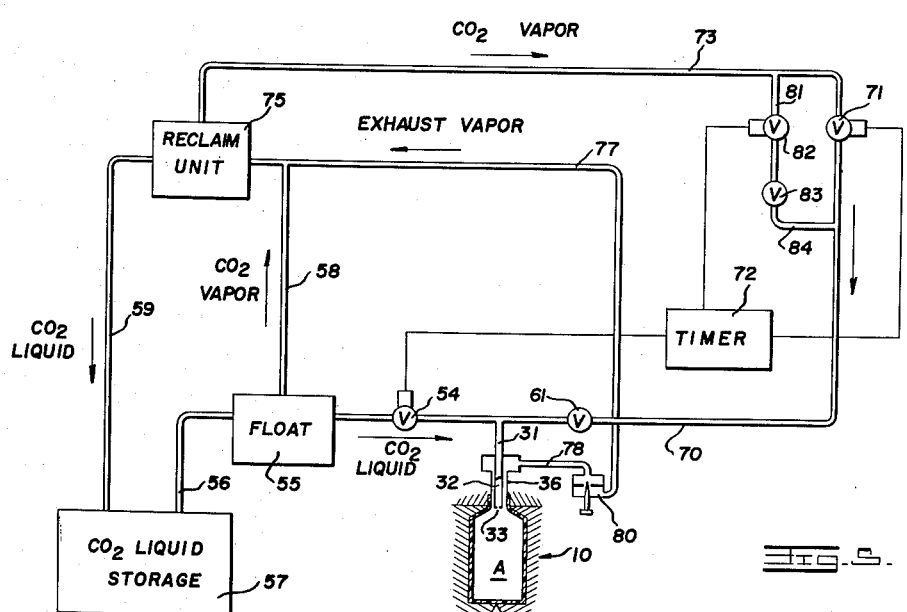
FIGURE 2 is an enlarged fragmentary vertical sectional view taken through a blow mold and the blowing components of an apparatus capable of carrying out the method of this invention.
Figure 3:
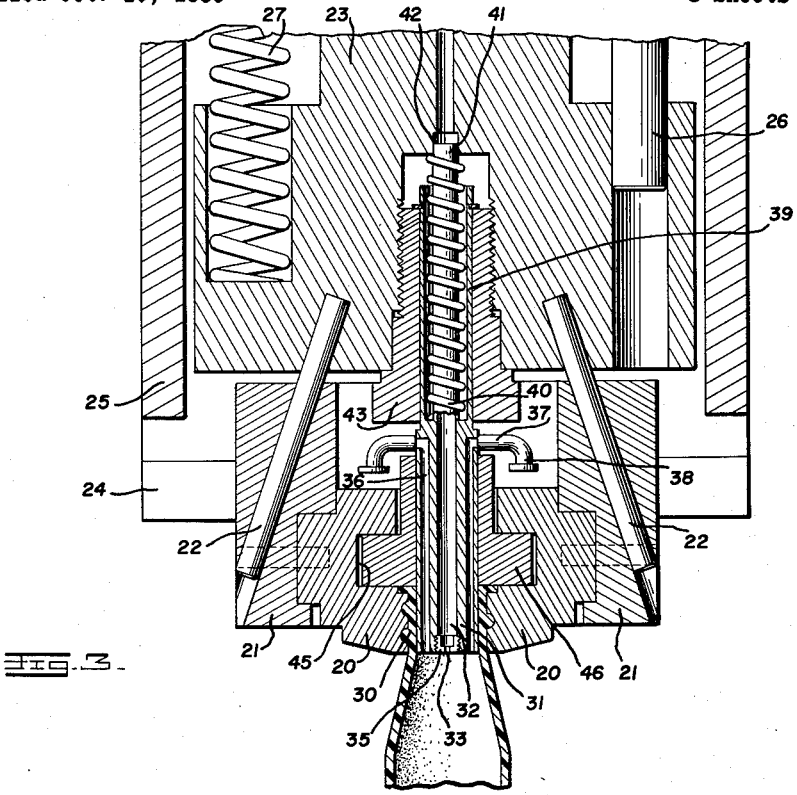
FIGURE 3 is an enlarged fragmentary sectional view similar to FIGURE 2 similarly illustrating the blowing components.

As shown on the drawings, in FIGURES 1 through 3, reference numeral 10 refers generally to a separable blow mold comprising a pair of complementary mold elements 11 having interior cavities 12 which cooperate to define the final shape of the blown portion of an article A.

As described in the Patent No. 2,804,654 and in the copending application U.S. Serial No. 797,276 filed March 4, 1959, of Allen and Elphee, now Patent No. 3,008,192, and assigned to the assignee of the present invention, the mold elements 11 are closable onto an extruded plastic tube 15 formed of thermoplastic material, such as polyethylene or the like and extruded through an annular extrusion orifice 16 defined by an annular nozzle 17 and an upstanding mandrel 18.

Initial extrusion through the orifice 16 takes place into a vertically movable neck mold, best illustrated in FIGURE 3 of the drawings and comprising a pair of separable neck-defining elements 20 carried by mold blocks 21 disposed on laterally, downwardly and outwardly inclined cam pins 22 fixed to a head or carrier block 23. The mold blocks 21 are guided laterally by slide surfaces 24 mounted on or formed integrally with a carrier 25 normally vertically movable with the head block 23, but guided for movement relative thereto by a guide pin 26. The block 23 and the carrier 25 are normally held in their illustrated relative positions by a spring 27 but vertically upward movement of the head 23 relative to the carrier 25, which movement is accommodated by the spring 27, will slide the blocks 21 and the mold sections 20 carried thereby laterally outwardly release an injection molded article portion 30 initially formed in the molds 20.

A neck mold pin 31 extends axially of the cooperating molds 20 and has an exterior surface cooperating with the neck molds to form the injection space for the article portion 30. This neck mold pin 31 is provided with a blowing passage 32 provided with a reduced orifice 33, preferably formed in a threaded orifice block 35.

Additionally, the neck mold core pin 31 is provided with a plurality of vent or exhaust passages 36 communicating with exhaust nipples 37 provided with variable orifice bleed valves 38. The neck mold pin 31 is also provided with an enlarged upper counter bore 39 in which a spring 40 is bottomed to urge the neck core pin 31 vertically downwardly into contact with the orifice mandrel when the neck mold is in its lower position.

A blow passage extension 41 extends axially internally of the spring 40 for entry into a slightly radially enlarged recess 42 formed in the head block 23, the sliding fit between the recess 42 and the extension 41 accommodating relative vertical movement of the neck core pin under the influence of the spring 40, such relative movement being limited. The neck core pin is also slidably retained within an externally threaded, internally bored retainer 43 threaded into the block 23.

It will be noted that the mold halves 20 are each provided with an arcuate medial interior recess 45 in each of which is slidably seated a guide block 46, the undersurface of which provides the lip of the container neck portion 30 and which also serves to guide the mold sections 20 during their relative lateral movement into accurate registry with one another.

Following the issuance of material from the orifice 16 into the neck mold cavity defined by the cooperating neck mold sections 20, the neck mold core pin 31 and the guide block 46, the neck mold is elevated to its position in FIGURE 2 while the issuance of material through the orifice 16 continues to extrude a tube integral with the material 30 filling the neck mold. Following extrusion into the tube, the blow molds 11 are closed thereon by a suitable actuating means (not shown), and the tube is subsequently blown to its final configuration.

A machine capable of carrying out the injection molding of the portion 30, the extrusion of the tube 15, the enclosure of the tube within the blow mold sections 11 and the blowing of the tube to its final configuration is illustrated in the above identified application, Serial No. 797,276.

The present invention is concerned with the apparatus illustrating it schematically in FIGURE 1 and the modified form illustrated in FIGURE 5 for blowing and cooling the article A. As illustrated in FIGURE 1, the blow passage 32 is connected to a conduit 50 connected to a source of air and having disposed therein a first valve 51 which is preferably a solenoid-actuated valve controlled by a timer 52 for shutting off and admitting air from the source. Preferably, the air enters pipe 50 at a pressure of about 60 to 100 pounds per square inch and at substantially ambient temperatures.

The passage 32 also communicates through line 31 with a second conduit 53 connected through a valve 54 also controlled from the timer 52, and a float chamber 55 with a conduit 56 leading to a source of refrigerant or cooling media medium 57. Since the preferred coolant of the present invention is carbon dioxide, this storage or source container 57 preferably contains liquid carbon dioxide at about 300 pounds per square inch pressure and at a temperature of about 0° F. The float chamber 55 is used to separate carbon dioxide vapors and carbon dioxide liquid with the removed carbon dioxide vapors being led through conduit 58 to a compressor 60 from which liquid carbon dioxide is fed back to the liquid storage tank 57 through a line 59.

The operation of the apparatus of FIGURE 1 is quite simple in that following extrusion of the tube and elevation of the neck mold 20, the blow mold 10 is closed on the tube and air under pressure is introduced through line 50 upon actuation upon the timer 52. This air is introduced through line 31, passage 32 and orifice 33 into the interior of the tube, inflating the tube against the interior or chill walls defining the cavity 12 of the mold 10. Thus, the container or other plastic article is blown to its final configuration by the use of air at a pressure of about 60 to 100 pounds per square inch and at substantially ambient temperatures. After blowing, valve 51 is closed by operation of the timer 52 and the introduction of air is terminated.

Next, the valve 54 is actuated by the timer 52 and the line 53 is connected through the float chamber 55 in line 56 to the carbon dioxide liquid storage tank 57. Interposed in the line 50 is a one-way check valve 61 preventing the passage of liquid carbon dioxide through the line 50 beyond the location of the valve 61. By virtue of the float chamber 55, substantially completely liquid carbon dioxide is introduced into the article A, which was previously blown to its article shape by air, through the restricted orifice 33. Further, by operation of the float chamber 55, the pressure of the liquid carbon dioxide may be reduced to any desired value, preferably on the order of 150 pounds per square inch.

When the liquid carbon dioxide is introduced into the article A through the restricted orifice 33, the carbon dioxide immediately expands into the container to form either a mixture of liquid carbon dioxide and carbon dioxide vapors or a mixture of solid carbon dioxide and carbon dioxide vapors. The nature of the mixture to be formed is determined by the internal pressure maintained within the container. At 60 pounds per square inch, a three phase liquid-solid-vapor mixture will be obtained. If the internal pressure in the container is above 60 pounds per square inch, the mixture will be predominantly liquid carbon dioxide and carbon dioxide vapors, while if the internal pressure of the article is less than 60 pounds per square inch, the solid-vapor mixture will prevail. By utilization of the variable orifice valves 38 in the outlet lines 37, the internal pressure within the article A may be regulated to obtain the desired mixture.

In either instance, a change of phase will occur with any liquid carbon dioxide vaporizing as it is heated by heat exchange from the hot article, similarly any solid carbon dioxide will sublimate. This change from a non-gaseous state to a gaseous state utilizes the inherent latent heat of such a change to chill the interior surfaces of the article. Preferably, the pressure interiorly of the container is slightly below 60 pounds per square inch so that the solid-vapor mixture will prevail inasmuch as it has been determined that most efficient heat extraction can be obtained in this matter.

Following cooling of the article A to a self-sustaining or thermally stabilized condition and venting of the article to atmospheric pressures, the article is removed from the apparatus by opening the separable blow mold sections 11 and the neck mold sections 20 and stripping the article from the neck mold core pin, all as described in connection with the above identified Allen and Elphee application, Serial No. 797,276.

Figure 4:
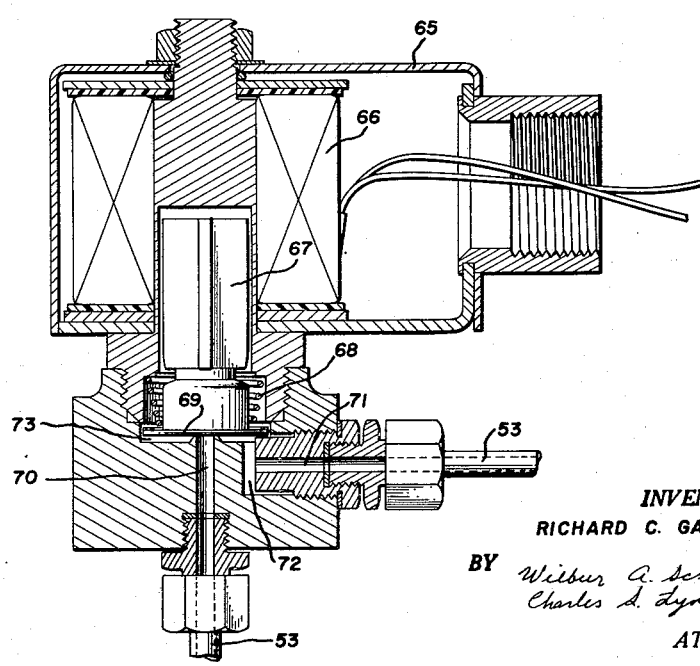
FIGURE 4 is an enlarged sectional view of a valve for controlling the blowing process.

One important factor in the efficiency of the apparatus is the prevention of premature expansion of the liquid carbon dioxide inasmuch as a substantial loss in heat capacity will occur thereby and further since the various passages and valves involved in the carbon dioxide supply system may become frozen or clogged with ice. Accordingly, it is preferred that a valve of the type illustrated in FIGURE 4 be utilized as the valve 54 interposed in the carbon dioxide line 53. Generally this valve includes a casing 65 enclosing a solenoid winding 66 encompassing a centrally located solenoid armature 67 movable vertically upwardly against the action of a spring 68 upon actuation of the solenoid coil 66. The armature 67 carries a lower valve element 69 controlling the egress of carbon dioxide through valve passage 70. Valve ingress passage 71 is the same diameter as the internal diameter of the supply passage 53 and of the same diameter as the egress passage 70. Further, the valve interior passages 72 and 73 are carefully dimensioned so as to prevent any premature expansion of the carbon dioxide during its passage through the valve.

It will be noted in connection with the embodiment of FIGURE 1 that the carbon dioxide introduced into the container after blowing and during cooling is exhausted through the interior pressure-controlling orifice valves 38. Thus, there is some loss and waste of gaseous carbon dioxide. Such a loss is prevented by utilization of the apparatus and method illustrated in FIGURE 5 of the drawings and in this figure, identical reference numerals refer to identical portions of the apparatus shown in FIGURE 1. The primary difference thus residing in the reclaiming of carbon dioxide utilized in cooling the bottle, it is preferred that a closed system be utilized to minimize the loss of carbon dioxide and to prevent contamination of carbon dioxide with blowing air. Consequently the tube 15 is blown to its final configuration within the blow molds 10 by means of carbon dioxide vapors under substantial blowing pressures introduced through line 70. This line 70 has interposed therein a control valve 71 operated from a three phase timer 72 and effective to control the flow of carbon dioxide vapor therethrough. The carbon dioxide vapor fed through the valve 71 and the line 70 to the orifice 33 is supplied from a reclaim unit 75 which receives carbon dioxide vapors from the float chamber 55 through line 58 and which also receives through line 77 exhaust vapors from the interior of the container A, such vapors being bled off through the passages 36 and a line 78 past a variable orifice valve 80.

To further prevent contamination with air a by-pass line 81 is provided to by-pass the blow supply valve 71, this line 81 having interposed therein a timer controlled valve 82 and a pressure reducing valve 83 having a restricted orifice across which a substantial pressure drop occurs, so that vapor issuing from the valve 83 and passing through line 84 into the blow line 70 is at atmospheric pressure (14.7 pounds per square inch approximately).

Now considering the operation of the apparatus illustrated in FIGURE 5 of the drawings, carbon dioxide vapor is normally supplied from the reclaim units 75 into the conduit 73 at a pressure of about 90 pounds per square inch and at substantially ambient temperatures. All three of the timer controlled valves 54, 71 and 82 are initially closed and during extrusion of the tube, valve 82 is open so that carbon dioxide at substantially atmospheric pressure is bled through valve 83 and line 84 to the line 70 in order that atmospheric pressure conditions obtain within the extruded tube, thereby either preventing the collapse of the tube during extrusion or the introduction of contaminant air. Following extrusion, halting of the neck mold, and closure of the blow mold 10 on the tube, valve 82 is closed and valve 71 is opened by the timer 72 so as to introduce carbon dioxide vapor at substantially the pressure of line 73, i.e., 90 pounds per square inch, and at substantially ambient temperatures into the tube to expand the tube against the cavity-defining walls of the mold sections 11. Even though some expansion will occur due to the orifice 33, no substantial cooling effect will be exerted by the carbon dioxide blowing vapor, i.e., no effect other than that of contacting the hot plastic tube during expansion with any gas at ambient temperatures and accordingly there will be no freezing of the tube to interfere with expansion.

Following expansion, the timer 72 closes the valve 71 and opens the valve 54, so that liquid carbon dioxide at a pressure of about 150 pounds per square inch and at substantially 0° F. is introduced into the article A. The substantial expansion which occurs in the sub-ambient temperature liquid carbon dioxide is again controlled by the size of the orifice of the valve 80 to obtain either a liquid-vapor mixture or a solid-vapor mixture and the resultant phase change aids the initially cold carbon dioxide in cooling the article substantially. Vapor escaping through the valve 80 is recycled through line 77 to the reclaiming unit 75 with liquid carbon dioxide being fed back to the storage chamber 57 through the line 59.

From the foregoing description of the alternate methods of the present invention, it will be noted that blowing is always accomplished by a gas under superatmospheric pressure but at substantially ambient temperatures, so that there is no substantial refrigerant-type cooling of the tube during expansion and the tube is not cooled prematurely to such an extent that interior surface defects are obtained or crazing susceptibility is increased. Further, initial heated tube-relatively cold mold wall contact is accomplished under a temperature gradient within the tube ranging from the tube temperature to no less than ambient temperature. Thus, the blowing can be readily accomplished without undue shrinkage, without the generation of harmful surface defects and without interfering with the normal blowing procedure. The subsequent introduction of carbon dioxide at superatmospheric pressures and at substantially sub-ambient temperatures effectively cools the blown container only after the final article configuration has been obtained. Further, the utilization of a restricted orifice at the point of introduction of the refrigerant into the article resulting in expansion only within the blown article, makes possible the utilization of the latent heat of vaporization of carbon dioxide from either its liquid or solid state to its gaseous state. The control of the vapor state within the article is very simply accomplished by controlling the pressure interiorly of the article.

The embodiments of the invention in which an exclusive property or privilege is claimed, are defined as follows:

1. In a method of making a plastic article by expanding a hot parison in the cavity of an enclosing mold, the improvements of introducing into the expanded, still hot parison while still confined in said mold liquid carbon dioxide, maintaining an internal parison pressure on the order of more than 60 pounds per square inch, and vaporizing said liquid carbon dioxide in situ to utilize the latent heat of vaporization thereof to cool the expanded parison.

2. In a method of making a hollow plastic article from a heated parison of plasticized material, the steps of enclosing the parison in a mold, injecting a heat exchange medium in a gaseous state into said parison to completely expand and to only partially cool said parison, and subsequently internally chilling the expanded parison by the same heat exchange medium in a non-gaseous state.

3. A method of making a hollow plastic article comprising extruding a tube having an opening at at least one end thereof, maintaining at least substantially atmospheric pressure in the tube during extrusion, closing a blow mold on the tube to pinch the tube shut at a portion thereof remote from one end thereof, introducing a gaseous blowing medium into the pinched tube to expand the same internally of the mold without excessively chilling the pinched tube during expansion, terminating the introduction of the blowing medium, thereafter introducing a non-gaseous chilling medium into the pinched and expanded tube, and effecting a phase change of said chilling medium internally of the tube to increase the absorption of heat from the tube by the medium.

4. The method of claim 3, wherein both the blowing medium and the chilling medium are carbon dioxide.

5. The method of claim 3, wherein the blowing medium is air and the chilling medium is carbon dioxide.

6. An apparatus for making plastic articles from a tube extruded from an orifice and having an open end, the tube being previously expanded in an enclosing blow mold, comprising a conduit for injecting liquid carbon dioxide into said tube through the open end thereof said conduit terminating in a restricted orifice through which the carbon dioxide enters the tube for expansion therein, and means for controlling the internal pressure developed interiorly of said tube to predetermine the phase state of carbon dioxide introduced thereinto through said orifice.

7. In an apparatus for making plastic articles blown from an extruded tube enclosed in a blow mold, means defining a restricted orifice communicating with the tube interior, a source of heat exchange fluid, first and second conduits interconnecting said source and said orifice, the fluid in said conduits being at substantially different temperatures, valve means in said conduits and valve control means for sequentially and separately interconnecting said orifice with said first conduit means and with said second conduit means respectively, whereby the tube is first blown without substantial chilling and then chilled internally.

8. In a method of making a plastic article, the steps of enclosing a heated extruded tube in a blow mold having interior chill walls, introducing into said tube a gaseous blowing medium at substantially an ambient temperature to expand the tube against the chill walls of the enclosing mold, subsequently introducing into the expanded tube a non-gaseous chilling medium and effecting a change of state in said chilling medium internally of the tube to cool the previously expanded tube.

9. In a method of making a plastic article by blowing a hot parison in the cavity of an enclosing mold, the improvements of expanding the parison in said cavity and then introducing under substantial pressures into the expanded, still hot parison while still confined in said mold liquid carbon dioxide and substantially expanding and vaporizing said carbon dioxide in situ to utilize the latent heat of vaporization thereof to cool the expanded parison.

10. In a method of making a blown plastic article by the expansion of a plasticized and extruded tube in a blow mold, the steps of initially expanding the tube in the mold, then injecting liquid carbon dioxide at a relatively high pressure into the previously expanded tube through a restricted orifice, maintaining a relatively low pressure internally of the tube to expand the liquid carbon dioxide in situ and to convert the carbon dioxide to its solid form, and sublimating the resultant solid carbon dioxide to cool the tube while supported by the blow mold.

11. An apparatus for cooling hot plastic articles blown in a blow mold from a parison enclosed therein, comprising a restricted orifice communicating with the tube interior, a source of liquified carbon dioxide, a conduit interconnecting said source and said orifice, a float chamber interposed in said conduit to substantially reduce the liquid carbon dioxide pressure and to insure the passage of substantially only liquid carbon dioxide through said orifice, an exhaust conduit in communication with said tube to vent carbon dioxide vapor therefrom, and means in said exhaust conduit to maintain a predetermined internal pressure in said tube.

12. In a method of making a hollow plastic article, the steps of extruding a tube, bleeding carbon dioxide at substantially atmospheric pressure into the tube during extrusion, enclosing the tube in a blow mold, introducing gaseous carbon dioxide into the enclosed tube to expand the same internally of the mold without excessively chilling the tube during expansion, terminating the introduction of gaseous carbon dioxide, thereafter introducing liquid carbon dioxide into the expanded tube, expanding the liquid carbon dioxide internally of the expanded tube to form solid carbon dioxide therein, and sublimating the solid carbon dioxide in the tube to absorb heat from the tube.

13. In a method of making a hollow plastic article from a heated parison of plasticized material, the steps of enclosing the parison in a mold, injecting air into said parison to completely expand and to only partially cool said parison, subsequently injecting carbon dioxide into the expanded parison and thereafter internally chilling the expanded parison by the in situ vaporization of non-gaseous carbon dioxide.

14. In a method of making a plastic article by expanding a hot parison in the cavity of an enclosing mold, the improvements of introducing into the expanded, still hot parison while still confined in said mold a non-gaseous heat exchange medium and vaporizing said heat exchange medium in situ to utilize the latent heat of vaporization of said medium to cool the expanded parison.

15. In a method of making a blown plastic article by the expansion of a plasticized and extruded tube in a blow mold, the improvements of injecting liquid carbon dioxide into the expanded tube through a restricted orifice, expanding the liquid carbon dioxide internally of the tube, and utilizing the resultant carbon dioxide vaporization to cool the tube while supported by the blow mold.

16. In a method of making a plastic article, the steps of enclosing a heated extruded tube in a blow mold having interior chill walls, introducing into said tube a gaseous blowing medium at substantially an ambient temperature to expand the tube against the chill walls of the enclosing mold, subsequently introducing into the expanded tube a vaporizable chilling medium at a substantially sub-ambient temperature, and vaporizing the chilling medium interiorly of the tube to utilize the heat of vaporization of said medium to internally cool the previously expanded tube.

17. In an apparatus for making plastic articles blown from an extruded tube enclosed in a blow mold, the improvements of means for introducing carbon dioxide into said tube and reclaiming said carbon dioxide comprising a restricted orifice communicating with the tube interior, a source of carbon dioxide liquified at a pressure in excess of about 150 pounds per square inch, first and second conduits interconnecting said source and said orifice, a reducing means in said second conduit to reduce the liquid carbon dioxide pressure to about 150 pounds per square inch and to insure the passage of substantially only liquid carbon dioxide through said orifice, pressure reducing means in said second conduit to reduce the carbon dioxide pressure to substantially less than 150 pounds per square inch and to insure the passage of only gaseous carbon dioxide at substantially ambient temperatures to said orifice, control means for sequentially and individually supplying carbon dioxide from said second conduit and said first conduit, an exhaust conduit establishing communication from said tube to said source, and a reclaiming unit interposed in said exhaust conduit for compressing exhaust carbon dioxide vapors and returning the same to said source.

18. In a method of making a plastic article, the steps of enclosing a heated extruded tube in a blow mold having interior chill walls, introducing into said tube a gaseous blowing medium to expand the tube against the chill walls of the enclosing mold, said blowing medium being at a temperature such that the gaseous medium is ineffective to substantially chill the tube during expansion of the tube, subsequently introducing into the expanded tube a chilling medium at a temperature substantially less than the temperature of said blowing medium, and vaporizing the chilling medium interiorly of the tube to chill and internally cool the previously expanded tube by both the initial temperature of the chilling medium and by the absorption of heat during vaporization of said chilling medium.

19. In a method of making a plastic article by expanding a hot parison in the cavity of an enclosing mold, the improvements of introducing carbon dioxide into the expanded, still hot parison while still confined in the mold, controlling the pressure internally of the expanded, still hot parison to obtain a desired non-gaseous carbon dioxide phase therein, and vaporizing the carbon dioxide internally of the expanded, still hot parison to utilize the latent heat of vaporization of the non-gaseous carbon dioxide to chill the parison.

20. In a method as defined in claim 19, the controlling of the pressure internally of the parison to less than sixty pounds per square inch to obtain predominantly solid carbon dioxide therein.

21. In a method as defined in claim 19, the step of controlling the pressure internally of the parison to more than sixty pounds per square inch to obtain predominantly liquid carbon dioxide therein.

22. In a method as defined in claim 19, the step of controlling the pressure internally of the parison to about sixty pounds per square inch to obtain a three-phase mixture of liquid, solid and gaseous carbon dioxide therein.

References Cited in the file of this patent

UNITED STATES PATENTS

| | | |
|---|---|---|
| 1,808,428 | Minor | June 2, 1931 |
| 2,066,265 | Freeman | Dec. 29, 1936 |
| 2,154,490 | Burch | Apr. 18, 1939 |
| 2,348,738 | Hofmann | May 16, 1944 |
| 2,632,202 | Haines | Mar. 24, 1953 |
| 2,750,625 | Colombo | June 19, 1956 |
| 2,834,154 | Koob | May 13, 1958 |
| 2,930,079 | Parfrey | Mar. 29, 1960 |